US006394717B1

(12) United States Patent
Mazaki et al.

(10) Patent No.: US 6,394,717 B1
(45) Date of Patent: May 28, 2002

(54) HIGH SPEED-PERFORATING APPARATUS

(75) Inventors: Shigeru Mazaki, Tokyo; Toshio Imaoka, Yokohama; Kusuo Sato, Tokyo, all of (JP)

(73) Assignees: Mitsubishi Materials Corporation, Tokyo; Nippon Diamond Corporation, Yokohama, both of (JP)

(*) Notice: Subject to any disclaimer, the term of this patent is extended or adjusted under 35 U.S.C. 154(b) by 0 days.

(21) Appl. No.: 09/671,014

(22) Filed: Sep. 28, 2000

(30) Foreign Application Priority Data

| | | |
|---|---|---|
| Oct. 22, 1999 | (JP) | 11-301753 |
| Feb. 25, 2000 | (JP) | 2000-049943 |
| Jun. 12, 2000 | (JP) | 2000-176035 |

(51) Int. Cl.[7] .......................... B23B 35/00; B23B 41/00

(52) U.S. Cl. .......................... 409/132; 408/1 R; 408/56; 408/124; 408/204; 175/403; 409/231

(58) Field of Search .......................... 175/58, 244, 403; 408/1 R, 56, 57, 68, 124, 144, 145, 204; 409/231, 233, 132

(56) References Cited

U.S. PATENT DOCUMENTS

| | | | | |
|---|---|---|---|---|
| 4,208,154 A | | 6/1980 | Gundy | |
| 5,004,382 A | * | 4/1991 | Yoshino | 408/60 |
| 5,378,091 A | * | 1/1995 | Nakamura | 409/132 |
| 5,393,175 A | | 2/1995 | Courville | |
| 5,503,508 A | * | 4/1996 | Amiguet et al. | 408/1 R |
| 5,636,949 A | * | 6/1997 | Nakamura et al. | 409/230 |
| 5,735,645 A | * | 4/1998 | Dungs | 408/1 R |
| 6,216,798 B1 | * | 4/2001 | Riello et al. | 173/152 |
| 6,227,777 B1 | * | 5/2001 | Kosmowski | 408/231 |
| 6,354,321 B1 | * | 7/2001 | Lind | 408/136 |

FOREIGN PATENT DOCUMENTS

| | | |
|---|---|---|
| JP | 62-290504 | 12/1987 |
| JP | 64-064810 | 3/1989 |
| JP | 2-022008 | 1/1990 |
| JP | 6-016011 | 3/1994 |
| JP | 6-024911 | 4/1994 |
| JP | 7-148729 | 6/1995 |

* cited by examiner

*Primary Examiner*—Daniel W. Howell
(74) *Attorney, Agent, or Firm*—Oblon, Spivak, McClelland, Maier & Neustadt, P.C.

(57) ABSTRACT

Disclosed is a high speed-perforating apparatus 1 comprising a rotor 17 into and through which a cylindrical rotary shaft 11 is integrally inserted, a stator 18 disposed around the outer periphery of the rotor 17 and a core bit 13 which is directly connected to the head end portion of the rotary shaft. A bit 15 having an outer diameter of up to 40 mm and a cutting edge thickness of less than 2 mm is used for the core bit 13. Perforation is carried out by the core bit 13 which is rotated at a high speed of 4000 rpm or more by a direct motor 2 comprising the rotor 17 and the stator 18. A perforating time can be greatly shortened by rotating the core bit at high speed.

20 Claims, 9 Drawing Sheets

FIG. 4

(RESULT OF TEST)

| Switchover of rotation | Actual rotational speed rpm | Perforating time sec | Distance of sound measurement m | Noise dB |
|---|---|---|---|---|
| Low speed | 2000-3500 | 49.00 | 1 | 71 |
| | 2000-3500 | 44.57 | 2 | 75.1 |
| | 2000-3500 | 43.92 | 3 | 74.7 |
| High speed | 5700-6300 | 26.00 | 1 | 77.9 |
| | 4900-6100 | 24.58 | 2 | 76.4 |
| | 4700-6100 | 24.37 | 3 | 75.6 |

FIG. 7

| | Circumferential speed m/min | Perforating time sec | Noise dB | Cutting efficiency $m^3$/sec |
|---|---|---|---|---|
| Direct motor | 289 | 24 | 72 | 261 |
| Conventional electric motor | 66 | 139 | 82 | 56 |

HIGH SPEED-PERFORATING APPARATUS

BACKGROUND OF THE INVENTION

1. Field of the Invention

The present invention relates to a high speed-perforating apparatus which bores annular holes in a material to be perforated comprising a concrete structure at high speed, for example, when anchors and the like are set up for the post-construction of the concrete structure.

The present specification is based on Japanese patent applications (No. HEI 11-301753, HEI 2000-049943, HEI 2000-176035) and the contents of these applications are incorporated herein.

2. Description of the Related Art

For strengthening an existing wall made of concrete, the following method is known: first, a hole having a large size is made in the wall to provide an opening; next, a brace (diagonal brace) made of iron is provided in the opening thus made; and then the brace and anchors disposed in the inward peripheral face of the opening are consolidated with concrete, to thereby strengthen all over wall. In this case, each anchor is received in a hole arranged in the inward peripheral face and set up therein.

The hole for setting up an anchor is formed by using an apparatus which comprises a core bit 80 having an annular bit 80*a* composed of diamond tip, cemented carbide tip or the like in the end of a cylindrical member, and a motor 81 for rotating the core bit 80 around the axis thereof, as shown in FIG. 9.

Namely, a core 83 having a columnar shape is formed by rotating the bit 80*a* provided in the end of the core bit 80 while the bit 80*a* is pressed against a concrete 82 to be perforated therein, followed by pulling out the core bit 80 from the inside of the concrete 82.

Then, the core 83 left in the inside of the concrete 82 is pulled out after breaking off the root thereof, whereby a hole having, for example, a degree of size-a diameter of 20 to 35 mm and a depth of 200 mm is formed for setting up an anchor.

In the above-mentioned apparatus, the motor 81 is heavy and lack of easy handling as in engines oil-hydraulic motors, or the like, because the motor 81 comprises gears through which the core bit 80 is rotated. In addition, the apparatus has a problem in generating a big noise (more than 90 dB). Further the apparatus has problems in that the number of revolution is as low as about 1500 rpm even at high speed and a maximum number of revolution is a degree of 3000 to 3900 rpm even in the case of special electric motors, whereby it takes a long time to perforate.

Ultrasonic perforating apparatus which perforate by ultrasonics can perforate with a comparatively low noise and on the other hand the perforating speed thereof is slow, to thereby take a long time to perforate as in the case of the above-mentioned apparatus having a motor.

Though a perforating time can be shortened by thinning the cutting edge thickness of the bit 80*a* of the core bit 80, there is a problem in that a tool load imposed on the bit 80*a* is increased and a force directed to a perforating direction (normal force) is increased, both due to thinning the cutting edge thickness, to thereby bring out the buckling of the core bit 80.

SUMMARY OF THE INVENTION

Accordingly, an object of the present invention is to provide a high-speed perforating apparatus which can perforates within a short time at a high revolution without buckling a core bit attached thereto, accompanied by a low noise.

The high-speed perforating apparatus of the present invention comprises a cylindrical core bit having a bit for boring an annular hole in a material to be perforated and a motor having a cylindrical stator disposed around the outer periphery of a cylindrical rotor into and through which a rotary shaft is inserted and to which the same is fixed, wherein the core bit is directly attached to the rotary shaft of the motor without transmission means such as gear, belt or the like and is directly rotated at high speed by the motor.

Accordingly, in the high-speed perforating apparatus of the present invention, a perforating speed can be greatly increased, as compared with the conventional apparatus which perforates at low speed.

Thereby, working for perforation can be rapidly carried out to shorten terms for various construction works having perforating works.

Further, in the high-speed perforating apparatus of the present invention, noise can be greatly reduced (about 70 dB) and as the number of parts are small, labors necessary for maintenance works can be greatly reduced, as compared with engines, oil-hydraulic motors and electric motors having gears.

As mentioned above, a tool load imposed on a bit can be decreased by rotating a core bit at high speed, whereby even when the cutting edge thickness of the bit is thin, a normal force which is directed to a perforating direction can be small, perforation can be smoothly carried out without troubles such as buckling while always maintaining a good cutting performance, and a perforating time can be reduced.

The method for a high-speed perforation of the present invention comprises the steps of: providing for a motor having a cylindrical rotor into and through which a rotary shaft is inserted and to which the same is fixed and having a cylindrical stator disposed around the outer periphery of the cylindrical rotor; attaching directly to the rotary shaft of the motor a cylindrical core bit having a bit for boring an annular hole in a material to be perforated without transmission means such as gear, belt or the like; and rotating directly the core bit at high speed by rotating the rotary shaft, to thereby bore a hole in the material to be perforated with the bit.

Accordingly, a perforating speed can be greatly increased, as compared with the conventional perforating method carried out at low speed.

Whereby, working for perforation can be rapidly carried out to shorten terms for various construction works having perforating works.

Further, in the method for a high-speed perforation of the present invention, noise can be greatly reduced (about 70 dB) and as the number of parts are small, labors necessary for maintenance works can be greatly reduced, as compared with engines, oil-hydraulic motors and electric motors having gears.

As mentioned above, a tool load imposed on a bit can be decreased by rotating a core bit at high speed, whereby even when a bit having a thin cutting edge thickness is used, a normal force which is directed to a perforating direction can be small, perforation can be smoothly carried out without troubles such as buckling while always maintaining a good cutting performance and a perforating time can be reduced.

BRIEF DESCRIPTION OF THE DRAWING

FIG. 4 is a table showing perforating times and noise when a hole is bored in concrete.

FIG. 7 is a table showing perforating times, noise and cutting efficiency when a hole is bored in concrete.

DESCRIPTION OF PREFERRED EMBODIMENTS

The high-speed perforating apparatus of the present invention is described in detail hereunder, referring to drawings.

Figure 1:
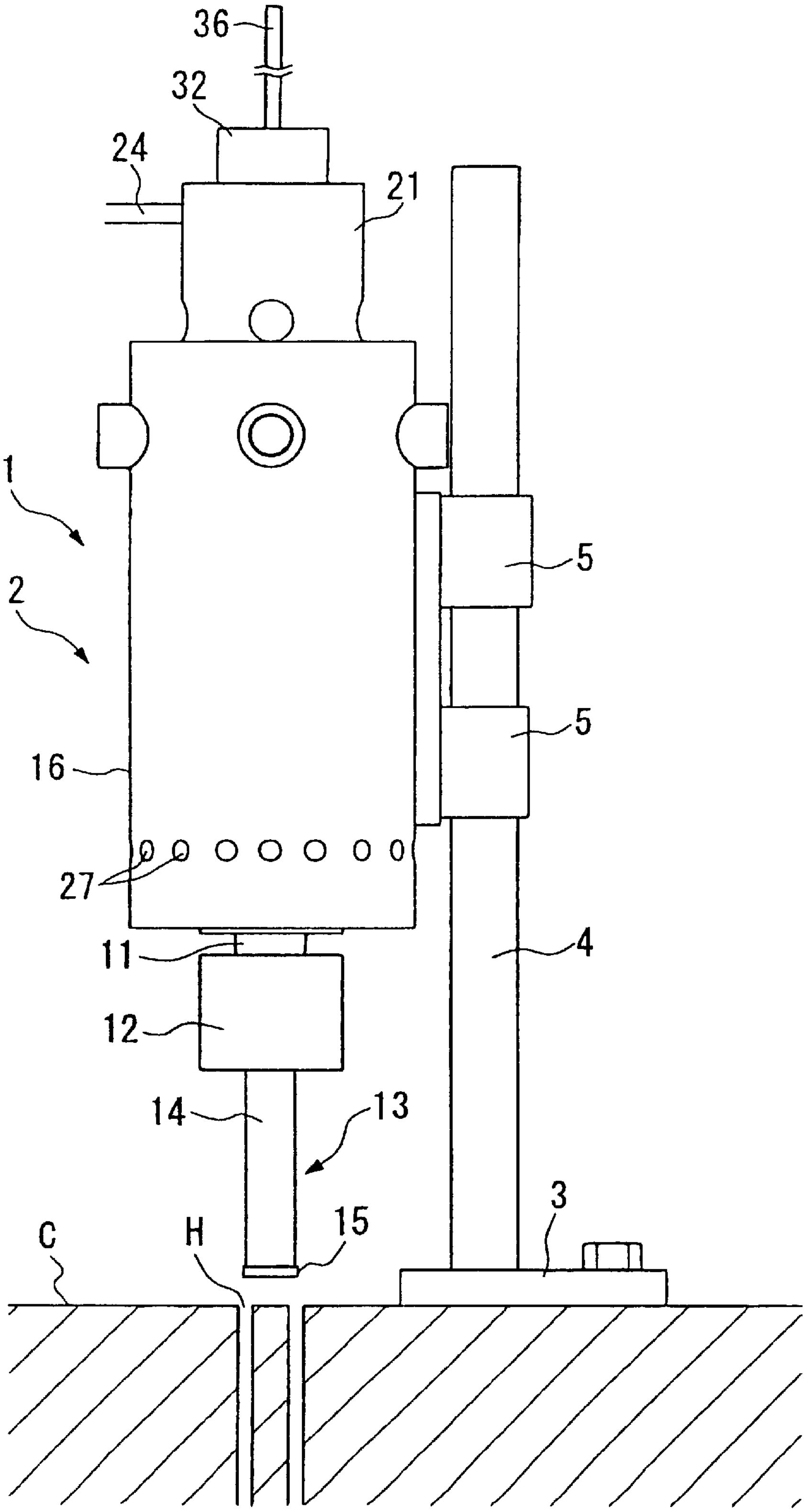
FIG. 1 is a side view of a high-speed perforating apparatus showing an example of the high-speed perforating apparatus of the present invention.
Figure 2:
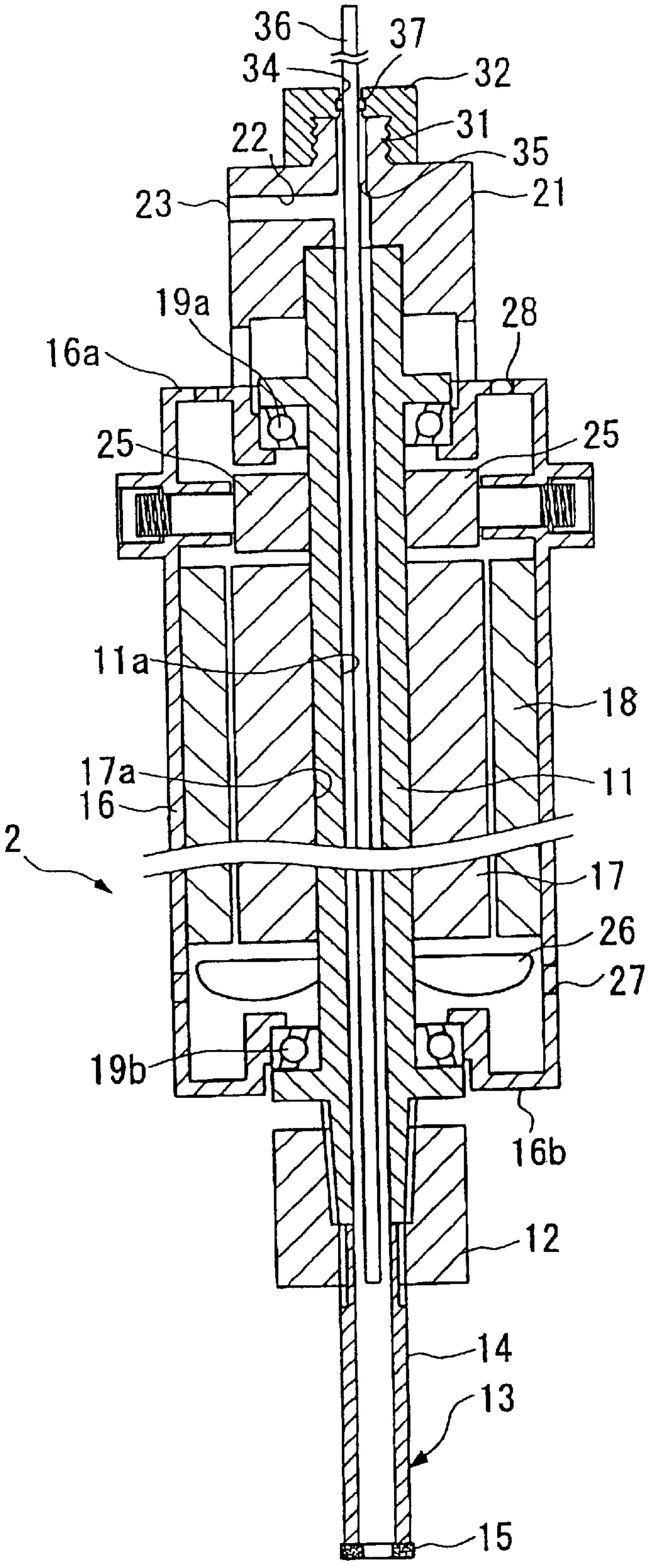
FIG. 2 is a sectional view illustrating a structure of direct motor which is used for the high-speed perforating apparatus of the present invention.

In FIGS. 1 and 2, a symbol 1 shows a high-speed perforating apparatus and a symbol 2 shows a direct motor composing the high-speed perforating apparatus 1. The high-speed perforating apparatus 1 has the following construction: the direct motor 2 is supported through an up and down-moving means 5 by a column 4 which is attached to a base 3 such that the column stands on the base; and the direct motor 2 can be moved along the column 4 by moving the up and down-moving means 5.

The direct motor 2 comprises a rotary shaft 11 having a cylindrical shape in the center thereof. A core bit 13 is connected to the head end portion of the rotary shaft 11 by aid of an adapter 12 such that the core bit can be attached to and detached from the rotary shaft. The core bit 13 comprises a bit 15 composed of diamond bit which is integrally provided in the head end portion of a tube 14 having a hollow shape and in the circumferential direction thereof.

Namely, the direct motor 2 is a type of direct motor wherein the core bit 13 is directly rotated which is a tool connected directly to the rotary shaft 11.

The core bit 13 comprises a bit 15 disposed in the end of the tube 14 and composed of a diamond tool which is produced by consolidating cemented carbides or superabrasives (diamond abrasive grains, CBN abrasive grains) with binders such as metal bond, resin bond or the like. A concrete C can be perforated and a columnar core can be formed by rotating the core bit.

A core bit 13 having an outer diameter of up to 40 mm can be used and preferable is an outer diameter of 15 to 30 mm. With regard to the cutting edge thickness of the bit 15, a thickness of less than 2.0 mm can be used and preferable is 1.8 mm.

The direct motor 2 comprises; a rotor 17 into and through which a rotary shaft 11 is inserted and to which the same is integrally fixed; and a stator 18 having a cylindrical shape disposed around the outer periphery of the rotor 17, wherein both of the rotor and stator are disposed in a housing 16 of the motor.

The rotary shaft 11 is inserted into and through an inserting hole 17*a* formed in the center of the rotor 17 and is integrally fixed to the rotor by press-inserting into the inserting hole 17*a*.

Figure 3:
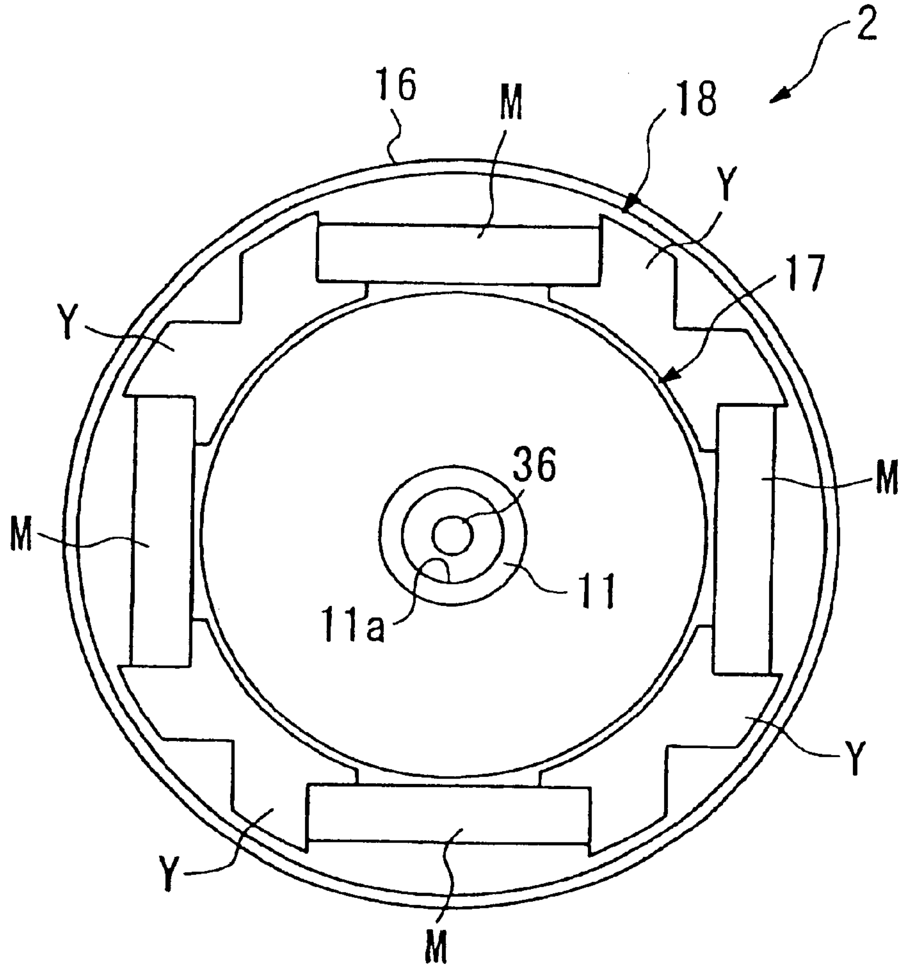
FIG. 3 is a cross-sectional view of a direct motor illustrating a structure of direct motor which is used for the high-speed perforating apparatus of the present invention.

As shown in FIG. 3, the stator 18 comprises magnets M disposed at some spaces in the circumferential direction and yokes Y made of steel which are disposed between the magnets M and support the magnets M in a prescribed position.

Bearings 19*a* and 19*b* are provided in the insides of the upper wall portion 16*a* and the under wall portion 16*b* of the housing 16 for supporting the rotor 17 in such a manner that the rotor 17 can be freely rotated. That is, the bearings 19*a* and 19*b* are provided to have such a construction that the bearings can support each vicinity of the upper and under portions of the rotary shaft 11 which is inserted into and through the center of the rotor 17 and can receive thrust and radial forces imposed upon the rotary shaft 11 and the rotor 17 into and through which the rotary shaft 11 is inserted.

A rotary joint 21 is provided in the back end portion of the direct motor 2. The rotary joint 21 is attached to the upper wall portion 16*a* of the housing 16 and is connected to the back end portion of the rotary shaft 11 in such a manner to be rotatable and liquid-sealed.

In the rotary joint 21, a flow line 22 is formed which is connected to the through hole 11*a* of the center of the rotary shaft 11 and is opened to the side of the rotary joint 21. A tube 24 is connected to an opening 23 which is opened in the above-mentioned side and a cooling water is supplied from the tube 24.

The cooling water which is supplied from the tube 24 to the flow line 22 of the rotary joint 21 passes the flow line 22 of the rotary joint 21 and then is introduced into the through hole 11*a* of the rotary shaft 11, and after that, is introduced into the tube 14 of the core bit 13 connected to the head end portion of the rotary shaft 11 by aid of the adapter 12, thereby cooling a portion which is perforated by the bit 15.

In the rotary joint 21, a setting screw 31 is formed in the back end portion thereof and a cap 32 is screw-clamped to the setting screw 31. An inserting hole 34 is formed in the center of the cap 32. Further, in the rotary joint 21, a connecting hole 35 is formed which connects the inserting hole 34 of the cap 32 and the through hole 11*a* of the rotary shaft 11. And an extruding bar 36 is inserted into and through the inserting hole 34, the connecting hole 35 and the through hole 11*a* which are connected each other. An O-ring 37 is provided between the extruding bar 36 and the cap 32 to form a seal.

Further, in the direct motor 2, a cooling fan 26 is provided in the head end portion of the rotary shaft 11, and air is introduced into the housing 16 from an inlet 27 formed in the head end side of the housing 16 by rotating the rotary shaft 11 and is sprayed to the inside of the direct motor 2. Then, air is introduced a gap between the stator 18 and the rotor 17 and a vacant space between the magnets M and yokes Y of the stator 18 and the housing 16, followed by being exhausted to the outside from an outlet 28 which is formed in the upper wall portion 16*a* of the housing 16.

A symbol 25 is a brush disposed in the circumferential direction of the rotary shaft 11 in such a manner that the brush contacts the rotary shaft 11 in the upper side of the inside of the housing 16 of the direct motor 2, and a driving current is supplied from the brush 25.

As the magnet M of the stator 18, high-density rare-earth magnets such as neodymium·iron·boron magnets or samarium·cobalt magnets are used which have a maximum magnetic energy product far higher than ferrite magnets or alnico magnets which are conventionally used.

With regard to a direct motor 2 comprising a rotor 17 and a stator 18, any one of motors with brush and brushless motors can be used. In addition, in the above-example, the magnets M are provided in the stator 18 and the coil is provided in the rotor 17. However, the coil can be provided in the stator 18 and the magnets can be provided in the rotor 17, or both of the rotor and stator can be coils.

Next, a case is explained hereunder, wherein a hole is bored in a concrete C to be perforated using a high speed-perforating apparatus 1 having the above-mentioned construction.

First, the direct motor 2 disposed in the upper side of the column 4 is adjusted to have such a position that an axis of the rotary shaft 11 coincides with a prescribed position to be perforated in the concrete C, followed by fixing the base 3 to the concrete C.

After setting the high speed-perforating apparatus 1 on the concrete C as mentioned above, the coil of the rotor 17 (or the stator 18) of the motor 2 is turned on electricity to rotate the rotor 17 at a high speed which is about 4000 rpm or more together with supplying a cooling water through the tube 24 from an apparatus for supplying cooling water (a cooling water source) which is not shown in Figs.

In the above-mentioned state, the bit 15 of the core bit 13 which is connected to the head end portion of the rotary shaft 11 is pressed against the surface of the concrete C by moving the direct motor 2 downward with the moving means 5. An annular hole H is bored in the concrete C by the bit 15 which is rotated at high speed, following the above-mentioned process.

After the annular hole H is bored to a prescribed depth, the motor 2 is moved upward to take out the bit 15 from the hole H, followed by removing the core formed in the center of the hole, to thereby form an anchor hole.

In a case where the core is left in the core bit 13 when the bit 15 is taken out from the hole H by moving the direct motor 2 upward, the extruding bar 36 is extruded to the head end portion thereof, thereby to enable to quite easily extrude the core left in the inside of the core bit 13 from the end side of the core bit 13.

According to the direct motor 2 having a construction mentioned above, the core bit 13 attached to the rotary shaft 11 is directly rotated by rotating the rotary shaft 11 without the aid of transmission means such as gear, belt and so on, with the result that the transmission loss can be removed and the perforating apparatus can be miniaturized and be made light-weighted as compared with motors having gears, to thereby increase the convenience in handling thereof, and that, the run out of the rotary shaft 11 can be minimized. Further, noise generated therefrom can be decrease to a minimum level.

Namely, as the bit 15 arranged in the head end portion of the core bit 13 is rotated by the direct motor 2, the rotary shaft 11 of which directly provides a rotating force to the core bit 13, the bit is rotated at a quite high speed (4000 rpm or more), to thereby enable to provide a quite high circumferential speed to the bit 15. That is, as the bit 15 can be rotated at high speed as mentioned above, a tool load on the bit 15 can be reduced, whereby a normal force can be reduced which is loaded to a perforating direction and a perforating time can be decreased even when the cutting edge thickness of the bit 15 is as thin as less than 2 mm.

Furthermore, as magnets provided to any one of the rotor 17 and the stator 18 are high-density rare-earth magnets such as neodymium·iron·boron magnets or samarium·cobalt magnets, the rotor 17 or the stator 18 can be miniaturized, to thereby enable to attain a further miniaturization and light-weight thereof.

The rigidity of the apparatus can be greatly increased over the whole as an integration is provide in such a manner that the rotary shaft 11 is press-inserted into the inserting-hole 17*a* which is formed in the center of the rotor 17 to directly fix the rotary shaft to the rotor, to thereby enable to form a hole by rotating the core bit 13 at high speed and to greatly increase a perforating speed as compared with the conventional perforating method which is carried out at low speed using the conventional perforating apparatus.

Thereby, work for perforation can be rapidly carried out to shorten terms for various construction works having perforating works.

Furthermore, noise can be greatly reduced (about 70 dB) and as the number of parts are small, labors necessary for maintenance works can be greatly reduced, as compared with the cases where engines, oil-hydraulic motors and motors having gears are used.

Still further, as the through hole 11*a* is formed in the center of the rotary shaft 11, a cooling water or cooling air can be supplied from the back end portion of the rotary shaft 11 to the bit 15 which is an edge of cutter of the core bit 13 to enable to carry out an excellent perforation.

Yet further, the core bit 13 can be easily exchanged for a core bit having a different diameter by attaching and detaching the core bit 13 by aid of the adapter 12, to thereby enable to easily carry out maintenance works such as the exchange of the core bit 13 and to increase the work efficiency thereof. In addition, as the core bit 13 is exchangeable, any bit for the bit 15 can be selected from ones having various cutting edge thickness and various shapes.

EXAMPLES

Test examples of a high speed-perforating method are explained hereunder, wherein the direct motor 2 mentioned above is used.

Test Example 1

Perforating times and noise were measured when annular holes H having a depth of 150 mm and a diameter of 25 mm were formed in a concrete C by rotating a bit 15 comprising a diamond tool at low speed and high speed with a direct motor 2, the results of which are shown in FIG. 4.

As shown in FIG. 4, it was found that when carried out at high rotational speed, the perforating times decreased to the extent of about a half, as compared with low rotational speed. With regard to noise, it was found to be the level of 70 dB regardless of a speed which is high or low.

Figure 5:
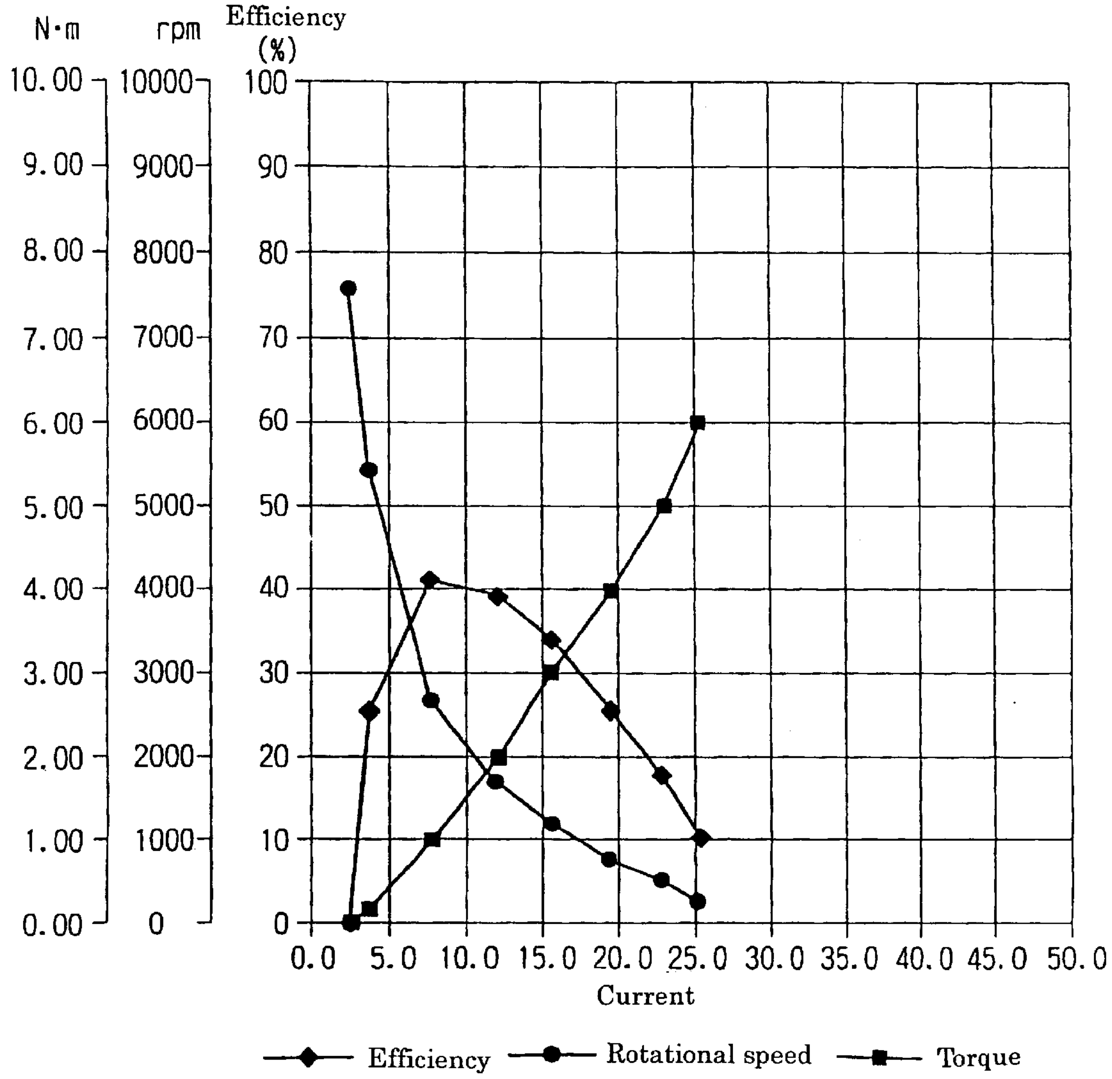
FIG. 5 is a graph showing the performance of a direct motor which is used in the method for a high-speed perforation of the present invention.
Figure 6:
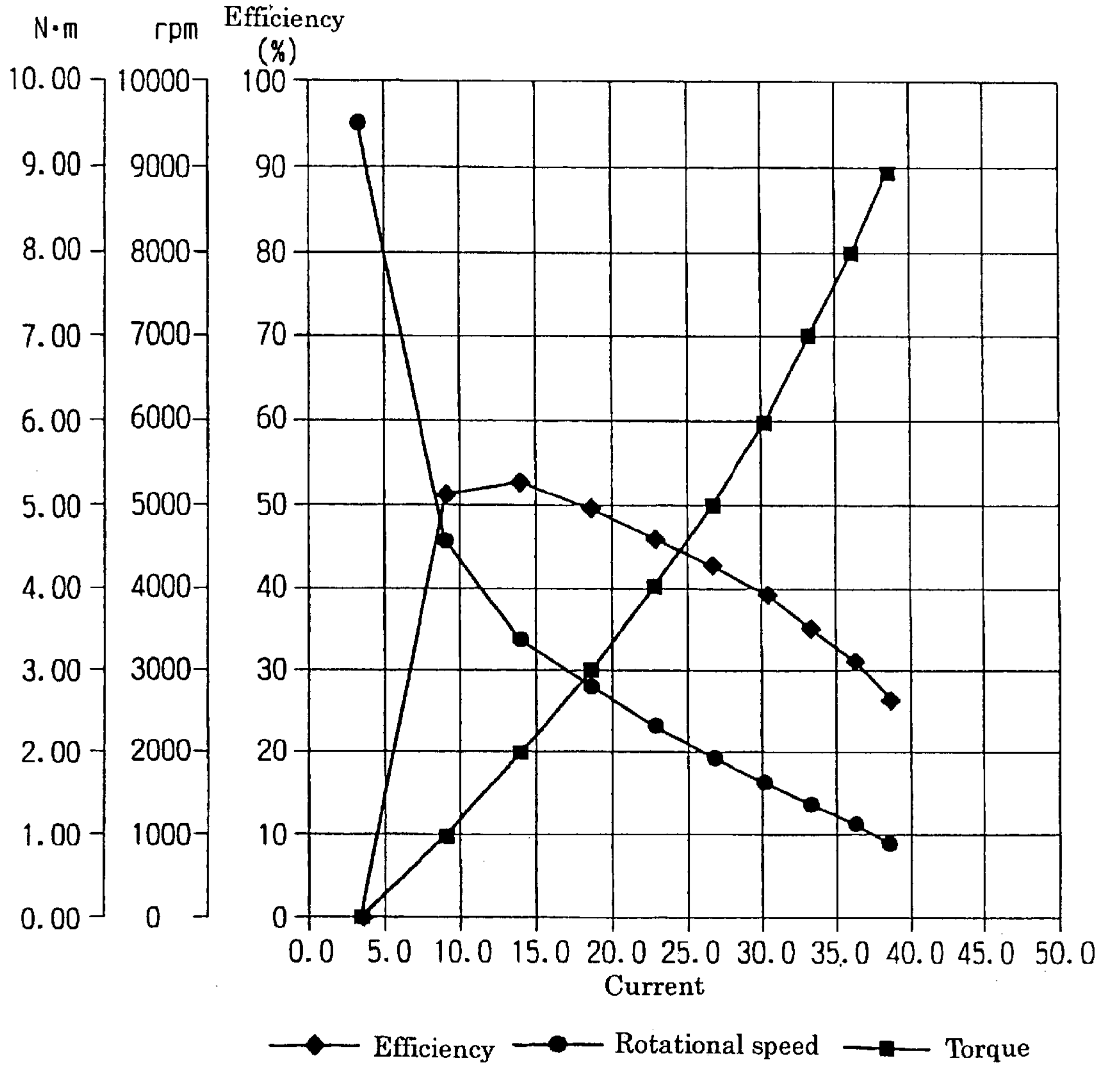
FIG. 6 is a graph showing the performance of a direct motor which is used in the method for a high-speed perforation of the present invention.

FIGS. 5 and 6 show the performance of a direct motor 2 used in the present test example.

FIG. 5 shows the results of the cases where low rotational speed was employed when load was imposed. FIG. 6 shows the results of the cases where high rotational speed was employed when load was imposed.

As is clear from FIG. 5, in the case of low speed (about 3000 rpm), torque was a degree of about 1 Nm and as is clear from FIG. 6, in the case of high speed (about 6000 rpm), torque was a degree of about 0.7 Nm.

Accordingly, it was found that when holes H were formed at high rotational speed, the torque was small as compared with low rotational speed.

Test Example 2

Holes H having a diameter of 25 mm (bit diameter 25 mm) and a depth of 200 mm were formed with a bit 15 comprising a diamond tool, using the conventional electric motor and the direct motor 2. Each number of revolution was as follows: 950 rpm for the electric motor; 5980 rpm for the direct motor.

The results showed that a perforating time was 1 min. 25 sec. for the electric motor, and 38 sec. for the direct motor.

A pressing force imposed from the upper side (a dead load is excluded) was 300–400N for the conventional motor and 50–150N for the direct motor 2.

Test Example 3

Holes H having a diameter of 20 mm and a depth of 130 mm were formed with a cylindrical core bit 13 having a diamond bit 15 in the head end portion thereof, using the conventional electric motor and the direct motor 2. Perforating times and noise according to different circumferential speeds of the bit 15 were measured, the results of which are shown in FIG. 7.

Each number of revolution was as follows: 4600 rpm for the direct motor 2; 1050 rpm for the electric motor.

As is clear from FIG. 7, it was found that when the rotational speed of the bit 15 was high (250 m/min. or more), the perforating time greatly decreased and the cutting efficiency greatly increased as compared with low rotational speed. The noise at high speed was found to be 10 dB lower than at low speed.

Test Example 4

Holes H having a diameter of 25 mm (bit diameter of 25 mm) and a depth of 200 mm were formed in materials to be perforated comprising concrete in a wet process at a rotational speed of 6000 rpm with two kinds of bits 15 each having a cutting edge thickness of 1.8 mm and 2.0 mm, which were carried out a plurality of times for each bit, and the perforating times were compared.

Figure 8:
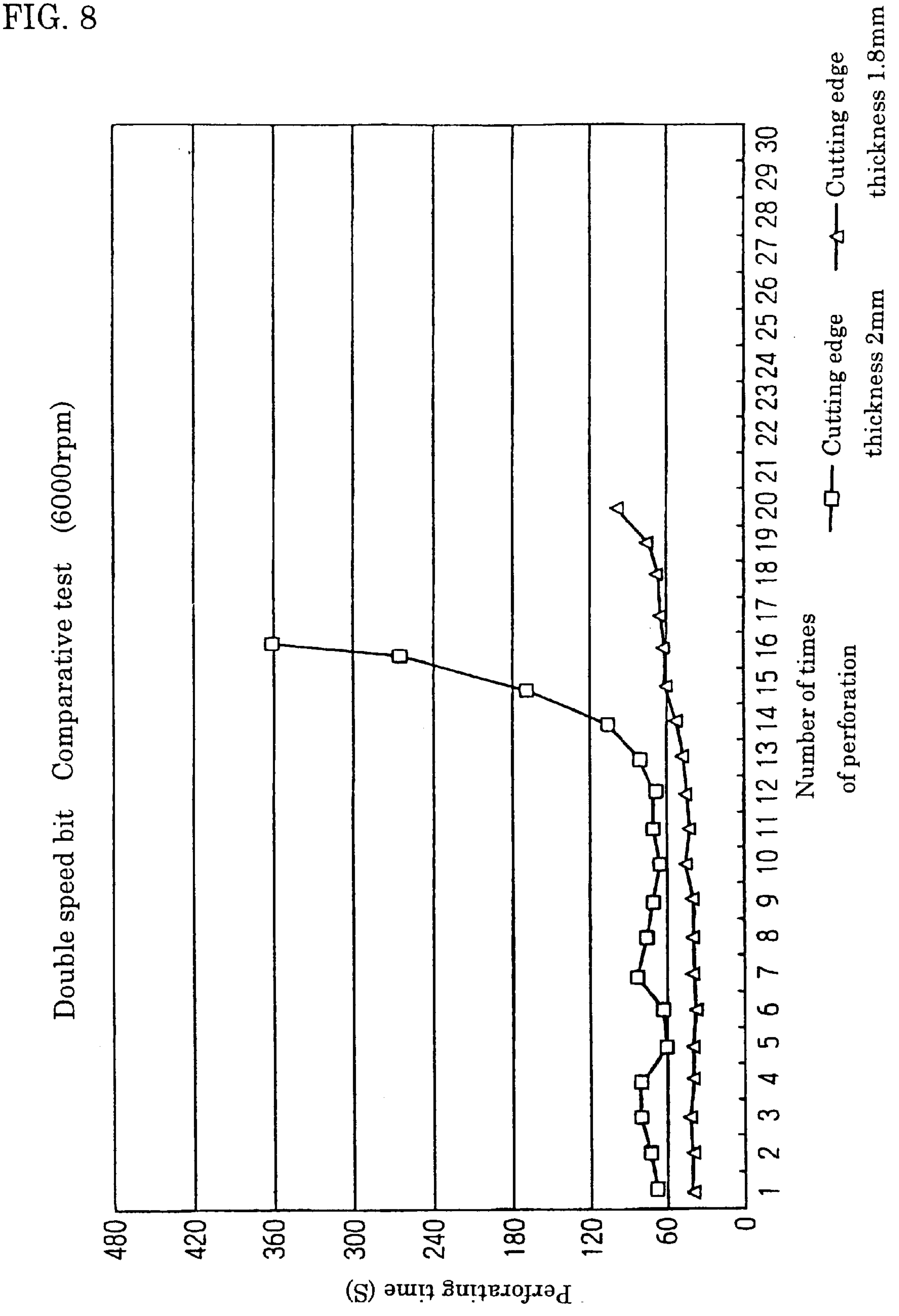
FIG. 8 is a graph showing the results of test for perforation when the perforation is carried out using bits having different cutting edge thickness.
Figure 9:
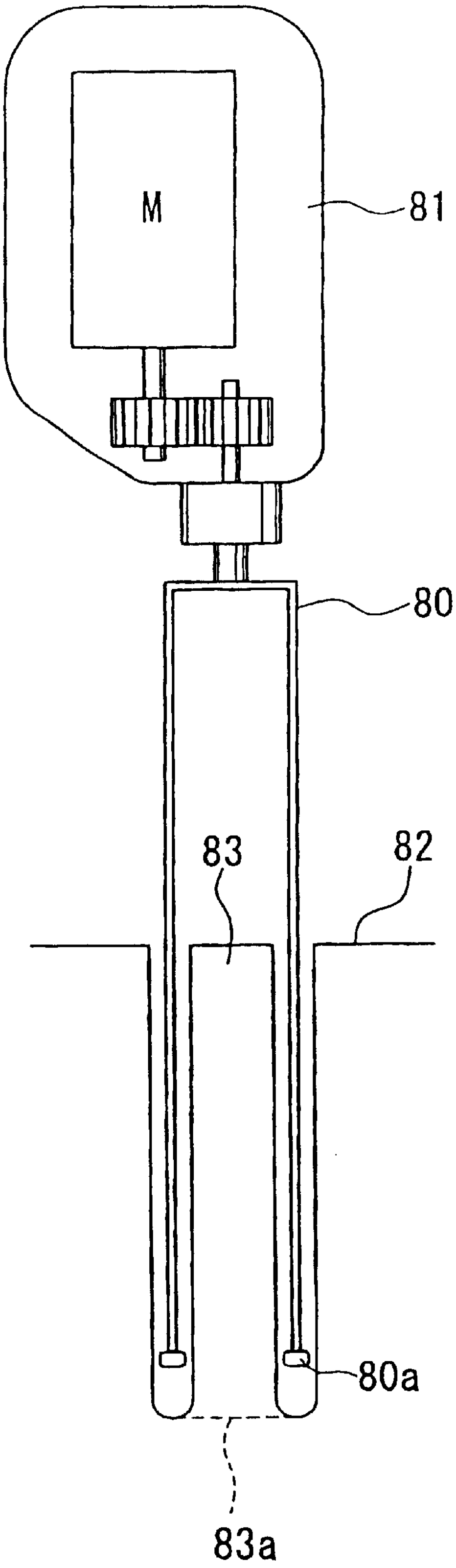
FIG. 9 is a sectional view illustrating the structure of the conventional perforating apparatus.

As shown in FIG. 8, in the case of a bit 15 having a cutting edge thickness of 1.8 mm, a good cutting performance was always maintained at an increased number of times while a cutting performance sharply deteriorated from around 15th time in the case of a bit 15 having a cutting edge thickness of 2.0 mm.

The edge of each cutter was observed after the tests, the results of which showed that the bit 15 having a cutting edge thickness of 1.8 mm exhibited no remarkable wear while the bit 15 having a cutting edge thickness of 2.0 mm exhibited wear.

As mentioned above, it was found that when a perforation was carried out at high rotational speed (4000 rpm or more), a perforating time could be shortened by using a bit 15 having a thin cutting edge thickness, and that, the wear of the bit was small and a good cutting performance could be always maintained.

This is because of a good spontaneous generation of cutting edge owing to a decreased load imposed on the bit 15.

Namely, it was found that a tool load imposed on the bit 15 could be decreased when perforation was carried out at high rotational speed, whereby even when a bit 15 having a thin cutting edge thickness was used, any troubles such as buckling were not caused, the perforation could be smoothly carried out while always maintaining a good cutting performance and a further high speed-perforation could be carried out.

What is claimed is:

1. A high-speed perforating apparatus comprising:

a cylindrical core bit having a bit for boring an annular hole in a material to be perforated; and a motor having a cylindrical stator disposed around the outer periphery of a cylindrical rotor into and through which a rotary shaft is inserted and fixed, wherein the core bit is directly attached to the rotary shaft of the motor without transmission means and is directly rotated at high speed by the motor, and wherein the rotary shaft has a coolant supply hole extending along an axis thereof.

2. The high-speed perforating apparatus as claimed in claim 1, wherein said core bit is rotated by said motor at a high speed which is 400 rpm or more.

3. The high-speed perforating apparatus as claimed in claim 1, wherein the bit provided to said core bit has an outer diameter of up to 40 mm.

4. The high-speed perforating apparatus as claimed in claim 1, wherein the bit provided to said core bit has an annular cutting edge having a radial thickness of less than 2 mm.

5. The high-speed perforating apparatus as claimed in claim 1, wherein an adapter for directly connecting the core bit is mounted to said rotary shaft.

6. The high-speed perforating apparatus as claimed in claim 1, wherein said rotary shaft is formed in a cylindrical shape and a cooling liquid is introduced from a back end portion of the rotary shaft to a head end portion thereof via the coolant supply hole, to thereby supply the cooling liquid to the bit of the core bit.

7. The high-speed perforating apparatus as claimed in claim 1, wherein said bit comprises superabrasives and a binder.

8. The high-speed perforating apparatus as claimed in claim 1, wherein said bit comprises cemented carbides and a binder.

9. The high-speed perforating apparatus as claimed in claim 1, wherein a coil is provided to said stator of said motor and said rotor of the motor comprises high-density rare-earth magnets selected from the group consisting of neodymium, iron, boron, samarium, and cobalt magnets.

10. The high-speed perforating apparatus as claimed in claim 1, wherein a coil is provided to said rotor of said motor and said stator of the motor comprises high-density rare-earth magnets selected from the group consisting of neodymium, iron, boron, samarium, and cobalt magnets.

11. A method for perforating at high speed comprising the steps of:

providing for a motor having a cylindrical rotor into and through which a rotary shaft is inserted and fixed and having a cylindrical stator disposed around the outer periphery of the cylindrical rotor, the rotary shaft having a coolant supply hole extending along an axis thereof;

attaching directly to the rotary shaft of the motor a cylindrical core bit having a bit for boring an annular hole in a material to be perforated without transmission means; and rotating directly the core bit at high speed by rotating the rotary shaft, to thereby bore a hole in the material to be perforated with the bit.

12. The method for perforating at high speed as claimed in claim 11, wherein said rotary shaft is rotated at a rotational speed of 4000 rpm or more during perforating, to thereby bore a hole in the material to be perforated with the core bit.

13. The method for perforating at high speed as claimed in claim 11, wherein a bit having an outer diameter of up to 40 mm is used for said core bit.

14. The method for perforating at high speed as claimed in claim 11, wherein the bit having an annular cutting edge with a radial thickness of less than 2 mm is used for said core bit.

15. The method for perforating at high speed as claimed in claim 11, wherein the circumferential speed of said bit is 250 m/min or more for perforating.

16. The method for perforating at high speed as claimed in claim 11, wherein said rotary shaft is formed in a cylindrical shape and a cooling liquid is introduced during perforating from a back end portion of the rotary shaft to a head end portion thereof via the coolant supply hole, to thereby supply the cooling liquid to the bit of the core bit.

17. The method for perforating at high speed as claimed in claim 11, wherein said bit comprises superabrasives and a binder.

18. The method for perforating at high speed as claimed in claim 11, wherein said bit comprises cemented carbides and a binder.

19. The method for perforating at high speed as claimed in claim 11, wherein a coil is provided to said stator of said motor and said rotor of the motor comprises high-density rare-earth magnets selected from the group consisting of neodymium, iron, boron, samarium, and cobalt magnets.

20. The method for perforating at high speed as claimed in claim 11, wherein a coil is provided to said rotor of said motor and said stator of the motor comprises high-density rare-earth magnets selected from the group consisting of neodymium, iron, boron, samarium, and cobalt magnets.

* * * * *